(12) United States Patent
Bruno

(10) Patent No.: US 7,468,591 B2
(45) Date of Patent: Dec. 23, 2008

(54) PROCESS FOR INITIALIZING A MOTORIZED ROLLER SHUTTER

(75) Inventor: Serge Bruno, Marnaz (FR)

(73) Assignee: Somfy SAS, Cluses (FR)

( * ) Notice: Subject to any disclaimer, the term of this patent is extended or adjusted under 35 U.S.C. 154(b) by 396 days.

(21) Appl. No.: 10/911,005

(22) Filed: Aug. 4, 2004

(65) Prior Publication Data

US 2005/0039863 A1 Feb. 24, 2005

(30) Foreign Application Priority Data

Aug. 19, 2003 (FR) .................................. 03 10029

(51) Int. Cl.
*E06B 9/24* (2006.01)
(52) U.S. Cl. ..................... 318/467; 318/468; 318/266
(58) Field of Classification Search ......... 318/466–470, 318/474, 476, 264, 265, 266, 283, 286, 430; 160/130, 133; 49/31, 36, 38
See application file for complete search history.

(56) References Cited

U.S. PATENT DOCUMENTS

| 4,831,509 | A | * | 5/1989 | Jones et al. ................. 700/90 |
| 4,959,598 | A | * | 9/1990 | Yoshida et al. ............. 318/599 |
| 5,270,932 | A | | 12/1993 | Yoshizawa et al. ..... 364/424.05 |
| 5,449,987 | A | | 9/1995 | McMillan ................... 318/266 |
| 5,663,621 | A | * | 9/1997 | Popat ......................... 318/480 |
| 5,736,824 | A | * | 4/1998 | Sato et al. .................. 318/561 |
| 5,838,126 | A | * | 11/1998 | Llerena ...................... 318/286 |
| 6,034,495 | A | * | 3/2000 | Tamagawa et al. .......... 318/266 |
| 6,563,279 | B2 | * | 5/2003 | Sugawara ................... 318/443 |
| 6,741,052 | B2 | * | 5/2004 | Fitzgibbon ................. 318/434 |
| 6,870,334 | B2 | * | 3/2005 | Jurado et al. ............... 318/282 |
| 6,875,976 | B2 | * | 4/2005 | Breed et al. ................ 250/221 |
| 6,906,487 | B2 | * | 6/2005 | de Frutos ................... 318/468 |
| 2003/0071590 | A1 | * | 4/2003 | Roman ....................... 318/282 |

FOREIGN PATENT DOCUMENTS

| EP | 0426577 A1 | 5/1991 |
| EP | 0574637 B1 | 4/1997 |
| EP | 1122404 A1 | 8/2001 |

OTHER PUBLICATIONS

John P. Hayes, "Introduction to Digital Logic Design", Addison-Wesley Publishing Company, New York, 1993. pp. 778-780 shows the organization of Motorola 68705 microcontroller.*
"The American Heritage Dictionary", second college edition, Houghton Mifflin Company, Boston, 1982. p. 1102 defines the word "screen" as "a movable device, as a panel, designed to divide, conceal, or protect."*

* cited by examiner

*Primary Examiner*—Bentsu Ro
(74) *Attorney, Agent, or Firm*—Frommer Lawrence & Haug LLP; Ronald R. Santucci

(57) ABSTRACT

In the initialization process for the control of the movement of a motorized roller shutter, the travel of the shutter between its two extreme positions is divided into different segments and each segment end is allocated a duration of shutter movement in a first direction between this segment end and a first reference position and a duration of shutter movement in a second direction between this segment end and a second reference position.

11 Claims, 2 Drawing Sheets

PROCESS FOR INITIALIZING A MOTORIZED ROLLER SHUTTER

RELATED APPLICATIONS

The present application claims priority from co-pending French patent application serial no. FR 03 10029 filed on Aug. 19, 2003.

FIELD OF THE INVENTION

The invention relates to an initialization process, for the control of the movement of a screen designed to move between two extreme positions, a control unit for controlling which comprises a clock, a memory and a logic processing unit and controls an actuator driving the screen. The invention also relates to a process for the control of the movement of a screen initialized by the initialization process and a device for implementing these processes.

PRIOR ART

It is common practice to install roller shutters in the openings of dwellings to give protection from the sun, to provide shade and to provide security against intrusions.

Both the installation, and the control of the movement, of these roller shutters are of some complexity and require the services of a skilled person.

The aim of the installation procedures is to define and where relevant store the extreme upper and lower positions where, in operation, the roller shutter must automatically stop.

The extreme upper and lower positions, or ends of travel, may be detected for example by position sensors, by counting the position of the shutter (with a coding wheel for example), by reading the absolute value of the current, by working out the timings, or by detection of overtorque combined with an end stop.

Whatever method is employed, the aim is to maintain accurate positioning over time and avoid producing stresses in the mobile component of the screen and in the kinematic chain that drives it.

Patent EP 0 574 637, the content of which is incorporated by reference, discloses a process for controlling a roller shutter based on the travel times. Initialization of the maximum travel times follows an action by the user: the shutter then makes a movement first in one direction, then in the other, between the extreme positions, and the measured travel durations are stored in memory.

This process is based on the assumption that the movement of the shutter follows a well defined relation of proportionality. However, in practice, the relation of position of shutter/duration of activation of the actuator is complex, and the proposed process does not therefore result in precise stopping at the extreme positions. A reinitialization procedure is therefore required after a defined number of shutter movements in order to eliminate drift. A more complex relation between movement and time is envisaged but not detailed.

Patent application EP 1 122 404, the content of which is incorporated by reference, provides a method of controlling a roller shutter in which the shutter ascending and descending times are measured during an intialization stage by detecting overtorque when the shutter reaches an end stop. A predetermined quantity is subtracted from each of these measured times, and the result is stored in memory. Thus, the movement of the roller shutter is controlled on the basis of the activation time and in theory does not reach the upper and lower end stops. To take account of differences of speed between ascending and descending, the process proposes calculating mathematically, at least each time the shutter stops, by a rule of three, the value which should appear in the counter corresponding to the reverse movement for an identical position of the shutter. The permanent active detection of overtorque allows obstacles or excessive drift to be detected. Drift, and stoppages at obstacles, that would tend to throw the system's settings out are handled by attributing to the counter the stored maximum value. In these cases the system corrects itself by a stoppage due to overtorque of the motor. The use of a rule of three assumes that the speed is constant during the entire movement. In reality, whether in the case of a roller shutter or a garage door, the torque values follow a non-linear curve, resulting in speed variations over the course of the travel. The results of the rule of three therefore give inaccurate results only and this calculation results in a large amount of drift.

These documents make no mention of the variations of temperature or supply frequency which affect the speed of the actuator. If the speed varies, the timings which govern the movement become wrong and in practice the end-stop detectors have to do the stopping. Therefore, although the object of the process is to reduce the opportunities for stresses to be applied to the shutter or its kinematic chain, these events are still frequent.

SUMMARY OF THE INVENTION

The object of the invention is to provide a process that mitigates the problems cited and improves the known processes of the prior art. The invention provides in particular an initialization process allowing the subsequent control of a screen in such a way as to minimize drifts and the opportunities for stresses to develop in the screen and in its kinematic drive chain. This process can be applied to devices whose physical characteristics are diverse.

In the initialization process according to the invention:
the travel of the screen between the two extreme positions is divided into different segments and
each segment end is allocated a duration of screen movement in a first direction between this segment end and a first reference position and a duration of screen movement in a second direction between this segment end and a second reference position.

This cutting up of the travel into different segments allows us to create a simple and accurate model of the torque exerted by the screen on the actuator during its travel.

The process for controlling the movement of a screen initialized by the above process is one in which the position of the screen is determined by the movement durations separating it from the reference positions, the latter being calculated from the last known position, from the time and from the direction of movement from this last position and from the movement durations associated with the ends of the segments.

The actuator can be operated at reduced speed on the approach to the extreme positions of the screen.

The screen device according to the invention is one in which the logic processing unit comprises software means for implementing the above processes.

The device advantageously comprises a power supply delivering a stable direct-current voltage and the actuator advantageously has an internal resistance with low sensitivity to temperature.

The accompanying diagram illustrates, by way of example, an embodiment of the process according to the invention.

DESCRIPTION OF THE PREFERRED EMBODIMENTS

Figure 2:
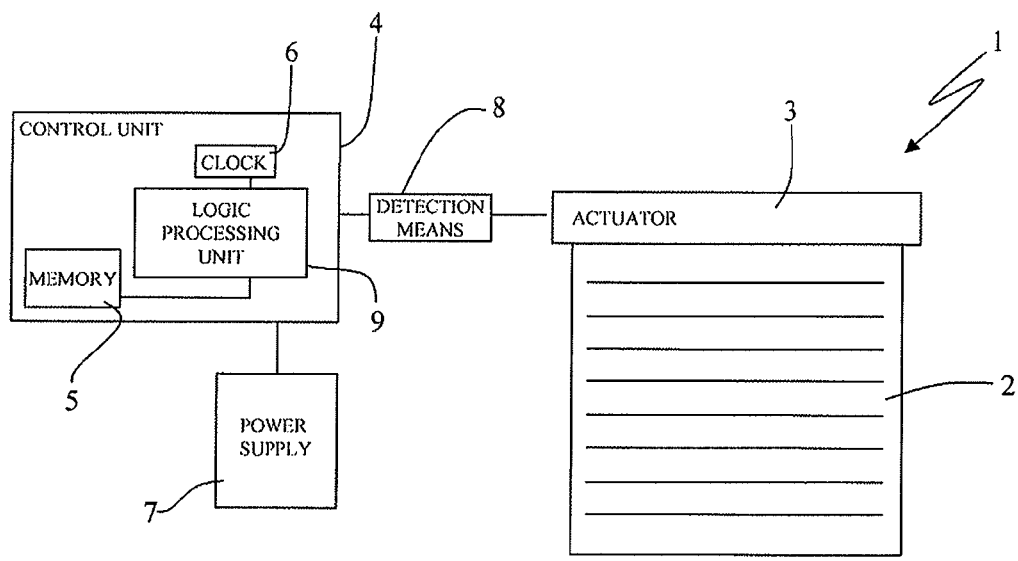
FIG. 2 is a diagram of a motorized screen device capable of carrying out the process according to the invention.

The process according to the invention applies to a motorized screen device 1 shown in FIG. 2, which mainly comprises a mobile component 2 designed to be moved between two extreme positions by an electric actuator 3. The screen device 1 may consist for example of a roller shutter or a garage door.

The actuator 3 is controlled by a control unit 4 comprising a logic processing unit 9, a memory 5 and a clock 6. The actuator 3 preferably comprises a direct-current motor running off a power supply 7 delivering a stable voltage (for example 24 volts plus or minus 1 volt). A motor with a low internal resistance (for example less than 14 ohms and preferably less than 5 ohms) connected to a voltage-stable power supply, whatever its environment, can be used to build a device for driving a mobile component whose speed of movement is relatively insensitive to temperature variations. The ability to control the speed of rotation allows precise control of the mobile component.

The device also comprises end-of-travel detection means 8 working preferably by measuring the torque provided by the actuator.

A command for the mobile component to move from one point to another is translated into a duration of actuator activation.

In a procedure prior to the process according to the invention, a precise reading is taken of the descent time Tdesc and ascent time Tasc of the shutter. The difference between the shutter descent time Tdesc and shutter ascent time Tasc is due to the load exerted on the actuator by the mobile component. In one direction the load assists the actuator, whereas it resists the movement in the second direction.

Figure 5:
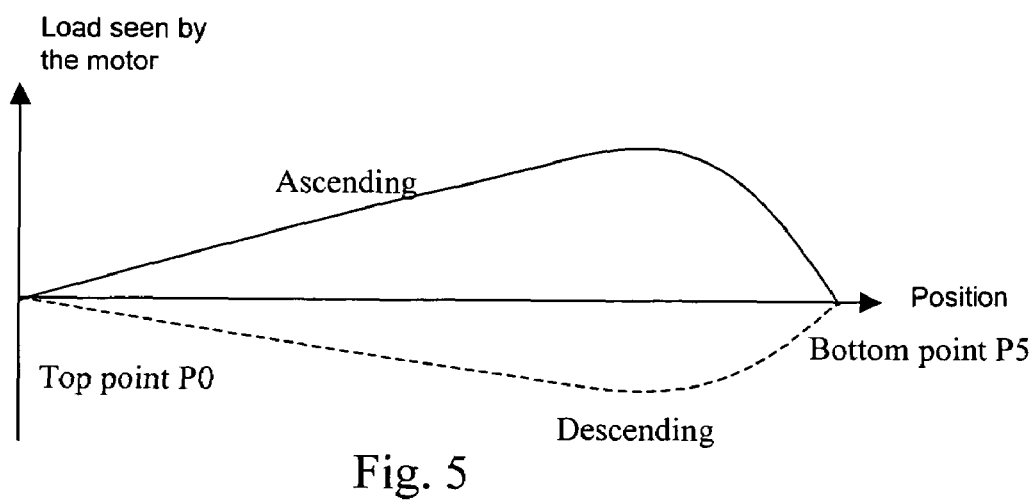
FIG. 5 is a graph showing the variations of the torque exerted by the screen on the actuator motor as a function of its position.

This simple difference between Tdesc and Tasc does not however, enable changes in the load during the course of the movement from one end stop to the other to be taken into account because the load driven by the actuator changes over the course of the movement. The actuator is made up of a motor with a partially irreversible speed-reducing mechanism. The load seen by the motor takes account of the different efficiencies of the speed-reducing mechanism; this is shown in FIG. 5. For example, for a shutter with stacking slats, the maximum effort when ascending is obtained when the lowest slat is raised (maximum load), once all the slats have been separated. The effort created by the load is however zero or low when the shutter is in the fully wound or the fully unwound positions.

Figure 3:
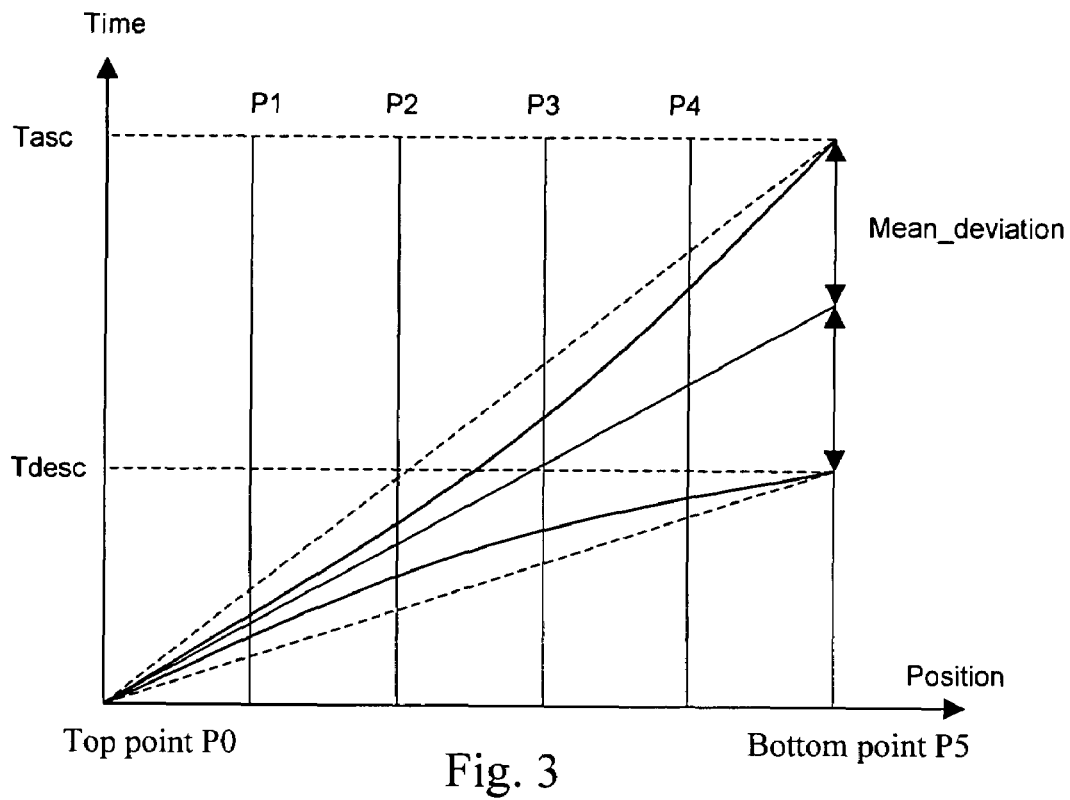
FIG. 3 shows in graph form relationships between the length of time the actuator is activated and the position of a screen, in both directions of movement.

The speed of movement of the screen is therefore not constant during the course of its travel. As a result, the curve of activation time/screen position is not linear, as FIG. 3 shows. To make the graph easier to read, the deviations are exaggerated.

The upper curve in that figure represents the time required to rise from a position P to the top position $P_0$ and the lower curve represents the time required to descend from the top position $P_0$ to a position P.

It will be seen therefore that for the position of the shutter to be known accurately simply by knowing the travel time, these non-linearities must be taken into account. The only easily measurable values are Tasc and Tdesc.

The initialization process according to the invention therefore involves firstly reconstructing theoretical curves for the activation times that are as close as possible to the real curves.

Figure 1:
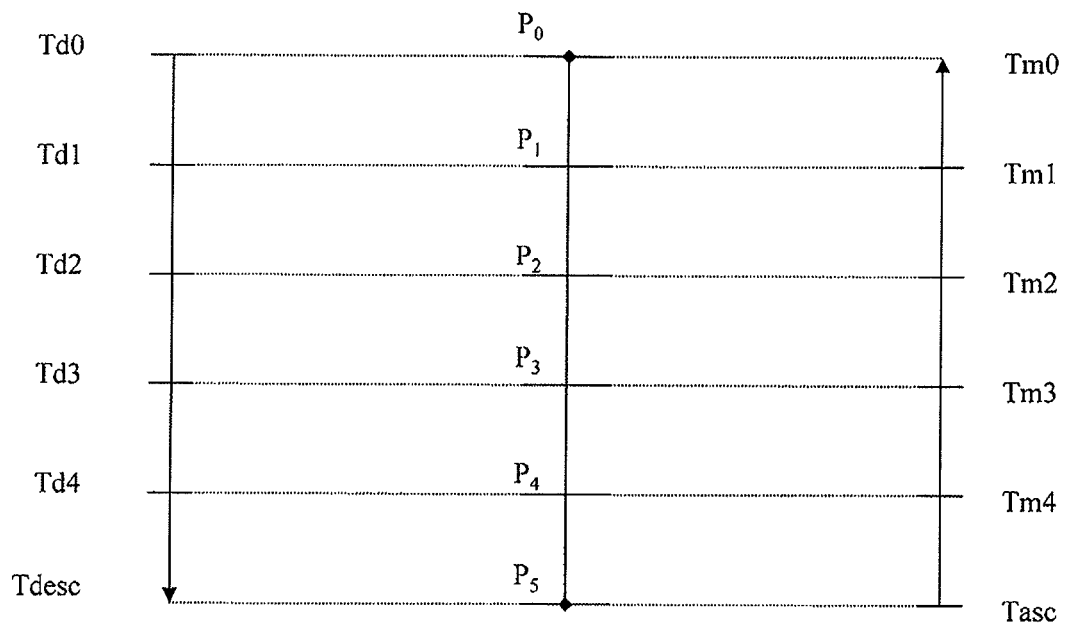
FIG. 1 is a diagram illustrating the manner in which the travel of the mobile component is cut up into different segments.

To this end, the physical travel of the screen, the limits of which are defined by its extreme top and bottom positions, are divided up arbitrarily. This step is performed by an algorithm which is run after the screen has made contact with its end stops, allowing Tasc and Tdesc to be measured. The segmentation corresponds to cutting the travel up into the physical points marked $P_0$ to $P_5$ in FIG. 1. Point $P_0$ corresponds to the extreme upper position of the screen, and point $P_5$ to the extreme lower position of the screen. Points $P_1$ to $P_4$ correspond to intermediate positions. These points are identical for both the ascending and descending movement.

Each point $P_x$ is associated with two durations. The first duration $Tm_x$ is the duration of movement (ascending) between this point $P_x$ and a first reference position in a first direction of movement and the second duration $Td_x$ is the duration between point $P_x$ and a second reference position in a second direction of movement. These durations are calculated from the Tasc and Tdesc values only and from an algorithm that factors in the theoretical load.

In the course of operation, the device uses a counter of the duration of movement in the first direction of movement, and a counter of duration of movement in the second direction of movement in order to locate its position with respect to two reference positions. For example, the two reference positions may coincide with each other and be the extreme upper position. The contents of the counters are thus denoted tm (the time required to move from the current position to the top position) and td (the time required to move from the top position to the current position).

In the case of a stoppage in or a passage through a position intermediate between the two extreme positions, the value of the counter in the direction of movement is compared with the time limit values of each segment, in the direction of movement, to determine which segment the intermediate position is in, and what level the screen is at within that segment.

The relative level within the segment is worked out from the time spent in the given segment and from a rule of proportionality based on the durations associated with the ends of the segment in this direction of movement.

Once the relative level is known, it is possible to work out the time which would be required, in the reverse direction of movement, to reach the nearest end of the segment to the reference position corresponding to this reverse direction of movement.

This duration, added to the value associated with this end in the reverse direction of movement is used to update the counter representing the position in the reverse direction of movement.

An obstacle is detected by the fact that the screen has been moving for longer than the maximum duration in the direction of movement or by an overtorque.

In a preferred embodiment, in the first segment at the top and bottom of the travel of the screen, or approach zones, the actuator switches automatically to slow speed, thus reaching its end stop at reduced torque and avoiding stresses on the screen or on its kinematic drive chain. The detection of overtorque can then be set at a lower limit than if the actuator were to reach the end stop at fast speed. Obstacle detection is thus more sensitive and stresses are also avoided.

With counters, the durations separating the position of the screen from the extreme reference positions in both directions of movement can be calculated each time the actuator stops in an intermediate position in the course of a movement. However, it is preferable to perform this calculation regularly throughout the movement of the screen. In this way it is possible to detect when the screen enters one of the approach zones and the speed of rotation of the actuator can be reduced.

The reference positions may be the extreme lower and/or upper positions, the important point being that the location of positions necessitates the use of both directions of movement. In the preferred embodiment, the extreme top position is used.

The initialization process and use process will now be illustrated in the case of a roller shutter with stacking slats.

Figure 4:
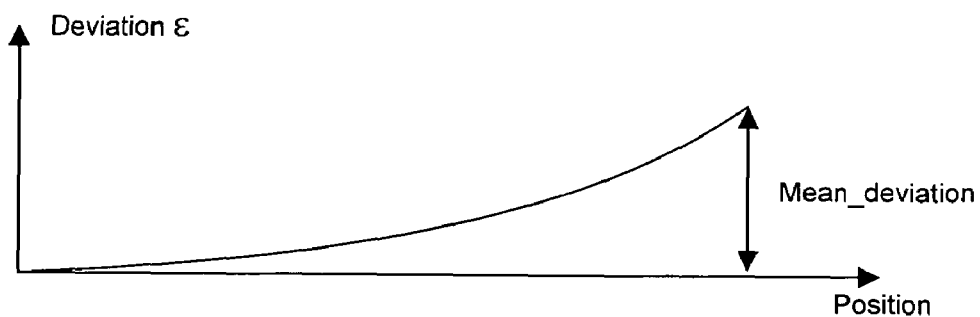
FIG. 4 is a graph showing the difference between the activation durations shown in the previous figure and the average travel duration, as a function of the position of the screen.

In this example, as can be seen in FIG. 4, the durations deviate from the mean activation duration in a roughly exponential manner.

To reconstruct the curves of the activation times, an exponential correction will be made to the mean movement duration. An exponential relation is easily constructed from the sum of the n first integer numbers, where n is the rank of the segment considered.

Consequently the travel cutting-up algorithm can be as follows:

The travel duration of the ascent Tasc and the travel duration of the descent Tdesc are known from an initialization process.

The selected reference position is the extreme upper position in both directions of movement.

A mean travel duration Tmean is defined by:

$$Tmean = \frac{Tasc + Tdesc}{2}$$

A mean deviation Mean_dev is defined by $$\text{Mean\_dev} = \frac{Tasc - Tdesc}{2}$$

Let p be a selected number of segments all of the same length. a is defined such that:

$$a = \frac{\text{Mean\_dev}}{\sum_{n=1}^{p} n}$$

Duration $Td_x$ required to reach the point $P_x$ from the extreme top position is defined by:

$$\{Tdx\}_{x=0 \to p} = \left\{ \frac{Tmean}{p} \times x - a \times \sum_{i=0}^{x} i \right\}_{x=0 \to p}$$

The duration $\epsilon_{x,x+1}$ separating the points $P_x$ and $P_{x+1}$ in the downward direction is defined as follows:

$$\{\epsilon_{x,x+1}\} = \{Td_{x+1} - Td_x\}_{x=0 \to p}$$

Likewise the duration $Tm_x$ required to reach the extreme top position from the point $P_x$ is defined by:

$$\{Tmx\}_{x=0 \to p} = \left\{ \frac{Tmean}{p} \times x + a \times \sum_{i=0}^{x} i \right\}_{x=0 \to p}$$

The duration $\epsilon_{x,x+1}$ separating the points $P_x$ and $P_{x+1}$ in the upward direction is defined as follows:

$$\{\epsilon_{x,x+1}\} = \{Tm_{x+1} - Tm_x\}_{x=0 \to p}$$

Depending on the particular screen device being controlled, other calculation algorithms, or tables, of the movement durations separating the segment ends may be used to take account of the torque curve, which is different for different types of screen.

Once the initialization process defining the different segments has been carried out, the position of the screen is determined by the duration separating the screen from the extreme upper position in the first direction of movement by the duration separating the screen from the extreme upper position in the second direction of movement.

For example, beginning in the extreme top position, after operating the actuator in the downward direction for a time td1, the device works out which segment the screen is in when it stops. Assuming that the limit points of the segment in which it is stopped are Td2 and Td3 in the downward direction and Tm2 and Tm3 in the upward direction.

The time tm1 to move the shutter back up to the top point is calculated as follows:

$$tm1 = \left[ \frac{td1 - Td2}{Td3 - Td2} \times (Tm3 - Tm2) \right] + Tm2$$

When the actuator stops after a time td1, the shutter is a time td1 away from its extreme top position in the downward direction and a time tm1 away from its extreme top position in the upward direction.

The shutter is also situated a time Tdesc-td1 from the extreme lower position in the downward direction.

Assuming that the actuator is then actuated upward for a time tm2, and that the screen is therefore moved to a new segment whose limits are Td1 and Td2 in the downward direction and Tm1 and Tm2 in the upward direction.

The new time remaining to raise the screen is: tm3=tm1−tm2

The screen is now also at a time td3 from its extreme top position, $$td3 = \left[ \left( \frac{tm3 - Tm1}{Tm2 - Tm1} \right) \times (Td2 - Td1) \right] + Td1,$$

that is at a time Tdesc−td3 from its extreme bottom position in the downward direction.

The screen position can also be calculated from the duration $\epsilon_{x,x+1}$ separating the points $P_x$ and $P_{x+1}$.

What is claimed is:

1. An initialization process, for determining the position of a screen and for the control of the movement of said screen (2)

designed to move between two extreme positions, the screen being associated with a control unit (4) which comprises a clock (6), a memory (5) and a logic processing unit (9) and which controls an actuator (3) driving the screen (2), in which process the travel of the screen between the two extreme positions is divided into different segments and each segment end is allocated a duration of screen movement in a first direction between the segment end and a first reference position and a duration of screen movement in a second direction between the segment end and a second reference position, wherein each position of the screen is determined by the duration separating the screen from at least a reference position.

2. The initialization process as claimed in claim 1, in which the reference positions are lower and upper extreme positions.

3. The initialization process as claimed in claim 1, in which the first reference position and the second reference position coincide.

4. The initialization process as claimed in claim 1, in which the movement durations are allocated to the segment ends by a computation algorithm that includes a theoretical curve of the load as a function of the position of the screen.

5. The initialization process as claimed in claim 1, in which the movement durations are allocated to the segment ends by a computation algorithm that includes a curve of the load as a function of the position of the screen defined by learning.

6. The initialization process as claimed in claim 1, in which the segments are of approximately the same length.

7. The initialization process as claimed in claim 1, in which the segments are so defined that the variation of the load of the screen is approximately constant on each of the segments.

8. A process for controlling the movement of a screen initialized by the process as claimed in claim 1, in which the position of the screen is determined by the movement durations separating it from the reference positions, the latter being calculated from a last known position, from the time and from the direction of movement from this last position and from the movement durations associated with the ends of the segments.

9. The control process as claimed in claim 8, in which the actuator is operated at reduced speed on the approach to the extreme positions of the screen.

10. A screen device (1) designed to move between two extreme positions, a control unit (4) for controlling which comprises a clock (6), a memory (5) and a logic processing unit (9) and controls an actuator (3) driving the screen (2), in which device the logic processing unit executes logic comprising:

dividing travel of the screen between the two extreme positions into different segments; and allocating to each segment end a duration of screen movement in a first direction between the segment end and a first reference position and a duration of screen movement in a second direction between the segment end and a second reference position, wherein each position of the screen is determined by the duration separating the screen from at least a reference position.

11. The screen device (1) as claimed in claim 10, wherein the said device comprises a power supply (7) delivering a stable direct-current voltage and wherein the actuator (3) has an internal resistance with low sensitivity to temperature.

* * * * *